United States Patent [19]

Coassin et al.

[11] Patent Number: 5,444,733
[45] Date of Patent: Aug. 22, 1995

[54] ELECTRIC ARC FURNACE WITH ALTERNATIVE SOURCES OF ENERGY AND OPERATING METHOD FOR SUCH ELECTRIC FURNACE

[75] Inventors: Giovanni Coassin, Pordenone; Corrado De Cecco, Ragogna; Gianni Gensini, S. Stefano di Buia; Sergio Gerussi, Pagnacco, all of Italy

[73] Assignee: Danieli & C. Officine Meccaniche SpA, Buttrio, Italy

[21] Appl. No.: 238,060

[22] Filed: May 4, 1994

[30] Foreign Application Priority Data

May 17, 1993 [IT] Italy .................. 93A000087
Aug. 13, 1993 [IT] Italy .................. 93A000166

[51] Int. Cl.$^6$ .................................... F27D 1/00
[52] U.S. Cl. .............................. 373/72; 373/85; 75/530; 266/47
[58] Field of Search ............ 373/2, 9, 71, 72, 85, 373/88, 116, 77; 75/59, 60, 10.45, 530; 266/41, 47, 99, 218, 222

[56] References Cited

U.S. PATENT DOCUMENTS

| | | | |
|---|---|---|---|
| 2,909,422 | 10/1959 | Schwabe | 373/88 |
| 3,459,867 | 8/1969 | Estes | 373/81 |
| 3,706,549 | 12/1972 | Knuppel et al. | 75/530 |
| 3,802,685 | 4/1974 | Brisse et al. | 266/41 |
| 3,811,386 | 5/1974 | Knuppel et al. | 266/41 |
| 3,902,889 | 9/1975 | Malin | 373/71 |
| 3,907,549 | 9/1975 | Brisse et al. | 75/60 |
| 4,249,719 | 2/1981 | Knuppel et al. | 266/47 |
| 4,749,408 | 6/1988 | Tate et al. | 373/9 |
| 4,827,486 | 5/1989 | Brotzmann et al. | 373/2 |
| 5,329,545 | 7/1994 | Dudill et al. | 373/72 |

FOREIGN PATENT DOCUMENTS

| | | |
|---|---|---|
| 257450 | 8/1987 | European Pat. Off. |
| 72.43819 | 12/1972 | France |
| 73.31142 | 3/1974 | France |
| 2323763 | 9/1975 | France |
| 3806977 | 3/1988 | Germany |
| 2192446 | 6/1986 | United Kingdom |

Primary Examiner—Bruce A. Reynolds
Assistant Examiner—Tu Hoang
Attorney, Agent, or Firm—Antonelli, Terry, Stout & Kraus

[57] ABSTRACT

Electric arc furnace with alternative sources of energy, which functions with direct current or alternating current and comprises at least one lance (12) to inject pure or combined oxygen above the bath (16) and a plurality of tuyeres (13) positioned in the hearth of the furnace (10) to inject oxygen below the bath, the tuyeres (13) being cooled by a peripheral movement of a cooling mixture consisting of at least one gas having a high cooling power (methane, butane, inert gases, etc.) and of at least one diluting gas (nitrogen, carbon dioxide), pipes (15) being included to introduce additives and powdered coal, post-combustion burners (28) possibly being comprised, the tuyeres (13) including an oxygen delivery pipe (18) having a diameter greater than 8 mm., the oxygen pressure being capable of being modulated according to the working steps, there being a constant minimum pressure of delivery. Melting operating method associated with such an electric furnace, wherein the charging operation with each single charge (skip) is divided into defined periods, with which are associated a pressure of delivery of oxygen through the tuyeres (13) and a percentage of gas having a high cooling power and proportioned to the rate of flow of the oxygen, there being a minimum pressure of delivery of oxygen in each moment of the working of the furnace (10).

26 Claims, 2 Drawing Sheets

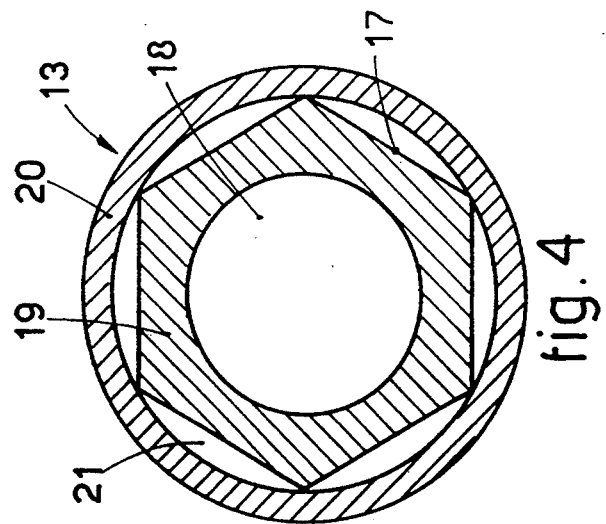
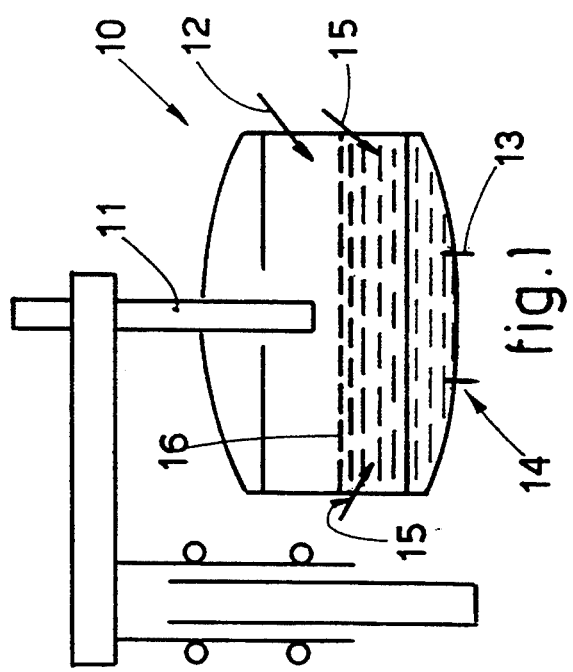
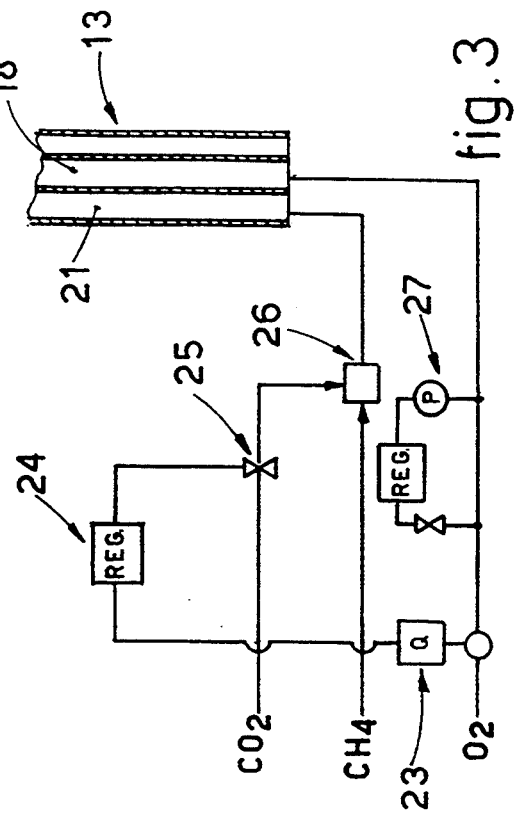
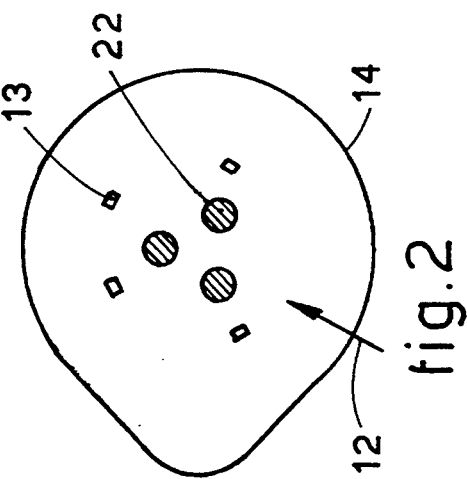

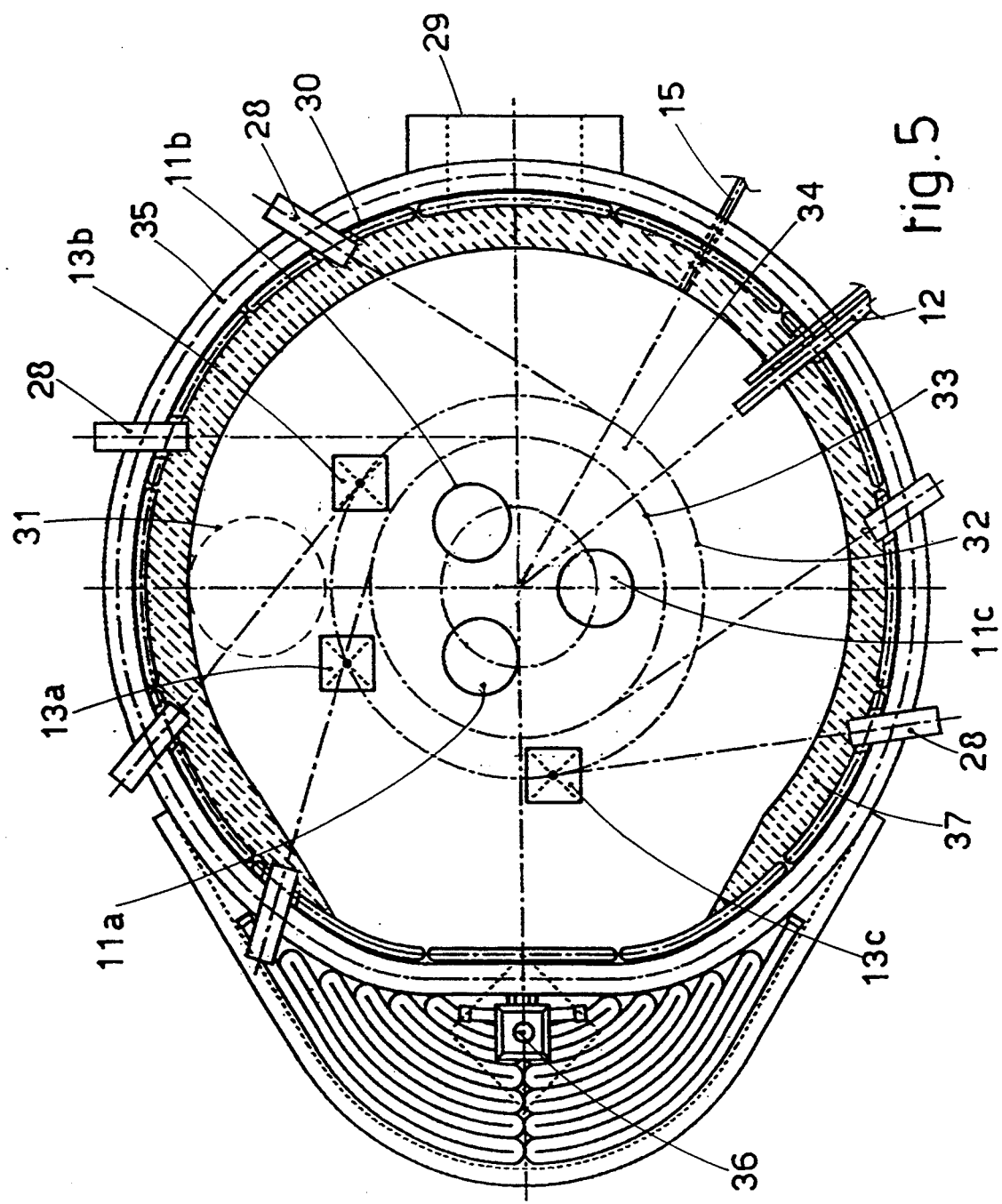

ELECTRIC ARC FURNACE WITH ALTERNATIVE SOURCES OF ENERGY AND OPERATING METHOD FOR SUCH ELECTRIC FURNACE

BACKGROUND OF THE INVENTION

This invention concerns an electric arc furnace to melt steel with alternative sources of energy and concerns also the relative operating method.

This invention is applied to the field of electric arc furnaces employed to melt steel and alloys thereof and has been conceived and designed to optimise the efficiency and output of the plant by using alternative sources of energy in a suitable manner.

The invention is applied to furnaces working with direct current and to furnaces working with alternating current.

The furnaces to which the invention is applied may have a tapping channel and a tapping hole without the positioning of the tapping hole being in any way restricted.

This is a typical preferred application for furnaces which work with the method of the "pond", that is to say, with a liquid heel always present.

The invention has the purpose of achieving significant savings of the energy consumed in feeding the furnace and of the melting times.

The invention is also particularly suitable for the melting of completely cold charges.

The invention is employed for charging the furnace with scrap by means of skips, or for continuous charging of scrap, or for continuous charging with pre-reduced material, or for mixed charges.

The methods of the state of the art for the melting of metals include the process of injecting gaseous elements into the furnace so as to accomplish a reaction of oxidation with the carbon and with the other oxidizable chemical elements in the molten metallic mass.

The oxidation reaction enables the intrinsic potential of energy of the carbon and of the other chemical elements to be recovered by means of an exothermic oxidation reaction.

The gaseous elements injected may consist of air enriched with oxygen or even of pure oxygen. These gaseous elements may be blown onto the molten metal by means of lances positioned above the surface of the bath and/or by nozzles or tuyeres placed on the bottom of the furnace.

U.S. Pat. No. 3,459,867 teaches the use of burners delivering oxygen in carefully calculated quantities and therefore with an excess of oxygen. These burners act along a circumference positioned between the electrodes and the sidewall of the furnace and work by following the movement of the metal.

U.S. Pat. No. 2,909,422 teaches the delivery of oxygen and other substances through a hollow electrode. The state of the art therefore includes the injection of additives and powdered coal through hollow electrodes placed in the roof of the furnaces. These additives and powdered coal supplement and replace the carbon used in the oxidation reaction and enable the contribution of energy provided by that reaction to be kept high.

GB-A-2,115,011 teaches the blowing of a stirring and processing gas from below the bath of molten metal, the introduction of solid carbonaceous material from above and the use of tuyeres positioned on the sidewall and delivering mixtures of gases towards the bath.

GB-A-1,421,203 teaches the delivery of oxygen and other gases from the bottom in a zone between the electrodes and the sidewall of the furnace.

FR-B-2,208,988 teaches the delivery of gases from above downwards into the furnace and also the delivery of gases from below the scrap and/or bath of molten metal into the zone of the electrodes and also between the electrodes and the sidewall of the furnace. This document discloses also in the sidewall one or more lances which deliver oxygen and/or other gases, in a configuration following movement of the metal, between the electrodes and the sidewall of the furnace.

EP-BI-0257450 discloses a method which includes a plurality of lances for oxygen, or mixtures of oxygen, working between the electrodes and the inner walls of the furnace and also a plurality of nozzles arranged below the molten bath in the zones where the lances work.

These nozzles positioned on the bottom are also employed to stir the bath and to make uniform the blowing action of the lances since, even when supersonic-type lances are used, the jet of the combustion gases cannot reach a depth greater then 20–30 cms. in the molten bath unless non-reusable throwaway lances are employed.

The nozzles and tuyeres of the state of the art work typically at pressures up to 60 bar and normally between 5 and 20 bar.

As can be seen in U.S. Pat. No. 3,902,889 and EP-BI-0257450, these nozzles and tuyeres positioned on the bottom have an oxygen emission diameter between 3 and 6 mm. and are advantageously of a two-pipe type with a central pipe emitting $O_2$ and an annulus emitting hydrocarbons and/or inert gases for cooling purposes.

The employment of tuyeres to blow from the bottom oxygen combined, for instance, with different fluids such as argon, nitrogen and methane enables the oxidation reaction to be improved and made uniform.

The technology of the tuyeres enables a better homogenization of the liquid steel to be achieved, thus making possible intensive working in a "long arc" condition without generating disuniformity of temperature and also making possible a shortening of the melting time and still other advantages.

In the state of the art the blowing of gases from the bottom is carried out at a relatively high pressure with relatively low rates of flow of the gases through a plurality of tuyeres, generally of a small diameter, distributed on the bottom.

The regulation of the blowing during the various working cycles is also carried out on the rate of flow of the gases; the pressure can be varied, but only as a result of the variation of the rate of flow.

In the state of the art the tuyeres are positioned substantially symmetrically on the hearth of the furnace and often correspond to the oxygen emission lances.

Such an arrangement of the tuyeres and lances delivering oxygen and other gases does not lead to any improvement in the efficiency and output of the melting plant.

SUMMARY OF THE INVENTION

The present applicants have therefore investigated, tested and surprisingly achieved this invention for the purpose of obtaining further improvements, in particular in the output of the plant, in the melting times, in the energy consumption, in homogenisation of the bath and therefore in greater reliability of the temperature values and analysis values.

The invention is based on a new technical and operating philosophical approach as compared to the state of the art, while employing known parts and components, but the use of such parts and components is carried out in an innovatory manner never before envisaged.

This invention uses in an innovatory manner the tuyeres technology for injecting gas from the hearth of the furnace so as to achieve a quick start-up of the oxidation reaction, to increase the area affected by the reaction and to speed up the melting of the charge. The gas is mainly pure or combined oxygen.

According to the invention the pure or combined oxygen is injected in a relatively great quantity at a pressure which can be modulated through tuyeres located in the hearth of the furnace.

The oxygen delivery pipe in the tuyeres is made of copper and typically has a diameter greater than 8 millimetres, depending on the capacity of the furnace and on the number of tuyeres included.

This oxygen delivery pipe is embodied advantageously by machining a bore in a polygonal or star-shaped section or, in any event, in a section having a symmetrical shape and capable of being circumscribed within a circumference so as to be able to key the section within a cylindrical pipe so as to create passages for the cooling mixture about the periphery of the pipe itself. This conformation is very important since it ensures uniform and constant cooling of the delivery pipe.

By polygonal section shall be meant hereinafter any section which can be circumscribed within a circumference.

The tuyeres according to the invention are positioned at least in the coldest zones of the furnace so as to contribute actively to the raising of the temperature in those specific zones.

The tuyeres in the bottom of the furnace are positioned with their centers arranged within a ring defined by two perimeters, namely an inner perimeter and an outer perimeter.

The inner perimeter in its position nearest to the center is at a distance which is a quarter of the line which connects a point of the outer casing to the center of the furnace, whereas the outer perimeter at its maximum extent is equal to three quarters of the line connecting a point of the outer casing of the furnace to the centre of the furnace.

According to a less evolutive variant the ring surrounding the tuyeres is circular.

This ring encloses the electrodes and is external thereto.

The resulting line of the outer perimeter of the ring as above defined is the result of a compromise between proceeding far from the centre of the furnace to heat the cold zones thereof and not arriving too near the walls so as to avoid damaging the refractory material.

The best position of the tuyeres is determined according to the position of the upper lances emitting oxygen, the position of the burners, the position of the fumes aspiration hole (fourth hole), and the position of the upper electrodes and of the bottom electrodes if the furnace works with direct current. According to a variant, account is also taken of the general structure of the furnace and of the other variables known a priori at the stage of designing the furnace itself.

In other words the tuyeres are positioned not symmetrically when it is more necessary to obtain energy to make the temperature of the bath uniform and to make the distribution of heat in the bath as symmetrical and homogeneous as possible.

The present applicants have found it advantageous, in an electric furnace with electrodes and with the fourth hole and with a bay, to provide at least three tuyeres and at least one supersonic oxygen lance. In this type of furnace two tuyeres are placed at the sides of the fourth hole, one of them on the side thereof towards the slag hole, while the third tuyeres is positioned towards the casting nozzle.

Instead, the oxygen lance of a supersonic type faces advantageously towards the center of the furnace and is positioned at the side of the electrodes.

According to a variant an auxiliary tuyere, substantially conformed like the other tuyeres but having characteristics of a differentiated flow rate or differentiated method of functioning, is included on the bottom in the zone where the supersonic oxygen lance cooperates with the bath of molten metal. Thus this auxiliary tuyere according to the invention acts after the melting has already begun and replaces the supersonic lance with certain types of steel and, more generally, with certain working conditions.

In the method according to the invention the pressure of emission of the oxidation gas is set and modulated according to the phases of charging of the furnace, and the rate of flow is allowed to vary functionally as a result of the variations set by the pressure.

When charging is carried out with skips, each charging phase is divided into a plurality of periods, each of which is characterised by a specific value of pressure and rate of flow of the injection of the oxidation gas.

Where charging is continuous, the whole cycle is divided into periods, each of which is characterised by a specific value of pressure and rate of flow of the blowing of the oxidation gases.

As the melting process proceeds, it is advantageous to increase progressively or, in any event, to vary suitably, according to the invention, the pressure of injection of oxygen with the increase in the quantity of carbon available for the oxidation reaction.

According to the invention, during the inactive phase between one charging cycle and the next the pressure of injection of the gas is brought to a determined minimum value and is kept at that value. This minimum value is represented by a pressure enough to overcome the liquid metal heel, that is to say, the ferrostatic pressure of the bath and also the dynamic action of the charge on the liquid metal at the moment of introduction of the charge. This minimum value is thereafter calculated so that a flow-back of liquid metal into the tuyeres will not take place, for such a flow-back might lead to a blockage of the tuyeres.

The working pressure of the oxygen within each cycle is determined according to the type of scrap or pre-reduced material or mixture thereof used for the melting and also according to the type of steel which it is desired to produce; this pressure is obtained experimentally by creating appropriate tables.

The oxygen is blown from the tuyeres at a pressure which can be varied and is substantially between 0 and 11 bar.

According to the invention the central blowing pipe is used to inject inert gases and oxygen when, for instance, the carbon to be combined with the oxygen to actuate the post-combustion has been exhausted.

This low blowing pressure according to the invention does not cause problems of splashing of the liquid steel. Moreover, it determines a low speed of rising of the molecules of oxygen within the bath of molten metal.

This leads to a longer stay time in the bath of molten metal and therefore a longer time available for combining with the carbon molecules.

The low speed of rising of the oxygen molecules is converted into a low speed of emerging of the oxygen molecules, by themselves or in combination, from the bath of molten metal, and this situation entails easier treatment of the oxygen molecules, by themselves or in combination, by the layer of slag, which thus acts as an element to slow and filter the combined CO molecules.

According to the invention the combination of the innovations introduced has the effect that the reaction of the CO molecules with the oxygen fed by the post-combustion burners takes place between the layer of slag and the bath of molten metal and in the layer of slag and therefore all the energy produced by this reaction is transferred directly to the bath or from the layer of slag to the bath without the typical losses of the known technology.

A low injection pressure causes also less turbulence in the bath and therefore less problems for the electric arc and therefore improves its efficiency.

The rate of flow of the oxygen in each single tuyere is a function of the capacity of the furnace and is comprised between about 0 and 1000 $Nm^3$ per hour; the optimum rate of flow is between 30 and 400 $Nm^3$ per hour with a ratio varying from $\frac{2}{3}$ to 1/10 of the rate of flow of the oxygen in each single post-combustion burner.

Each tuyere according to the invention can be controlled individually according to the zone in which it is positioned. Thus, with particular requirements or situations occurring during the melting it is possible to have a greater or smaller injection of oxygen from one tuyere than from another tuyere.

According to the invention the cooling mixture passing through the annular pipes of the tuyeres consists of at least one gas with a high cooling power such as, for instance, methane or another suitable hydrocarbon, and of a gas with a diluting function such as nitrogen or carbon dioxide, for instance.

According to the invention the percentage of methane in the mixture depends on the rate of flow of the oxygen introduced into the furnace and on the specific period of the working cycle during which the introduction takes place.

According to the invention, this adjustment of the cooling mixture is carried out by acting on the delivery line of the diluting component of the mixture, in this case nitrogen or carbon dioxide, so that no interruptions of the flow of methane ever take place. In fact, it has been found that such interruptions of the delivery of methane in the cooling mixture might cause sudden and dangerous increases of temperature in the tuyeres.

According to a variant of the invention a specific pipe, advantageously a ceramic-coated pipe having a diameter of about 18-25 millimetres, is also pre-arranged to limit powdered coal on a carrier of air or nitrogen below the level of the molten bath so as to replace the carbon used in the oxidation reaction.

According to a further variant the injection of coal is carried out by means of, or also by means of, tuyeres positioned in the bottom of the furnace in a carrier of oxygen or another gas.

The quantity of coal introduced into the bath of molten metal is a function of the oxygen introduced and of the equivalent carbon contained in the scrap or pre-reduced material.

The emmission of coal, if carried out with a lance, is performed directly within the liquid metal below the surface layer of slag which forms in the melting bath.

The peripheral zone too of introduction of the coal is determined as a function of the specific requirements which arise during the operating steps, that is to say, as a function of the zones more heavily oxidised beforehand, where there occurs, therefore, the greatest need to compensate and replace the carbon used in the reaction.

According to the invention it is possible to ascertain whether a metallic mass still not fully molten still exists on the bottom of the furnace at the end of the melting and during the refining process. This is carried out by assessing whether the temperature gradient to bring the molten mass to the tapping temperature during the refining step corresponds to values which correspond to the condition of a fully molten mass.

If, for instance, it is found that the temperature gradient is less than the reference values, this means that a quantity of metallic mass not perfectly melted exists on the bottom of the furnace.

Therefore, in the successive casting, or in the refining step itself if the check is carried out in real time, at least the parameters of the pressure of the injection from the bottom are changed so as to increase the energy in the bath and to complete the melting of the not fully molten mass.

According to the invention two or more post-combustion burners are included and are positioned in such a way that their oxygen-containing jet affects the zone of greater enrichment of CO, namely the zone of the ring affected by the emission of the cone of oxygen from the tuyeres and/or from the supersonic oxygen lances.

The wide dispersion of the oxygen emitted is assisted by the great diameter of the tuyeres themselves.

BRIEF DESCRIPTION OF THE DRAWINGS

The attached figures are given as a non-restrictive example and show a preferred embodiment of the invention as follows:

FIG. 1 is a diagram of an electric arc furnace;

FIG. 2 is a diagrammatic plan view of the hearth of a DC furnace;

FIG. 3 is a block diagram of the system to regulate the composition of the cooling mixture;

FIG. 4 is a form of embodiment of a tuyere employed in the method according to the invention;

FIG. 5 is a plan view of an electric furnace with a bay and an eccentric tapping hole according to the invention.

DETAILED DESCRIPTION OF THE PREFERRED EMBODIMENTS

An electric furnace system 10 shown in FIG. 1 comprises a system of an upper electrode or upper electrodes 11 to generate an electric arc and, in this example of a DC furnace, of bottom electrodes 22 located in a hearth 14 of the furnace 10.

The method of working of the electric furnace 10 according to the invention provides for the injection of pure or combined oxygen into the bath so as to start a reaction with the carbon contained in the molten metallic mass and to produce energy.

This oxygen is injected through tuyeres 13 positioned in the hearth 14 of the furnace 10 and is also injected by means of suitable supersonic lances 12 above the surface of the bath.

The tuyeres 13, which are in a number that varies according to the capacity of the electric furnace 10 but are at least three, are positioned (FIG. 2) in this case in an asymmetrical manner in the zones determined as cold in the electric furnace 10.

FIG. 5 shows three tuyeres 13, namely a first 13a, a second 13b and a third 13c. These tuyeres 13 are positioned on the hearth 14 of the furnace 10 in relation to a fourth hole 31, to a slag hole 29 and to a tapping outlet 36 as well as to the upper electrodes 11.

As can be seen in FIG. 5 the first and second tuyeres 13a–13b are positioned at the two sides of the fourth hole 31 and in cooperation with first and second upper electrodes 11a–11b. The second tuyere 13b is displaced towards the slag hole 29.

Instead the third tuyere 13c is positioned towards the tapping outlet 36 and slightly to the side of the median axis of the hearth 14 of the furnace 10 so as to cooperate with the cold zone between the first 11a and third 11c upper electrodes. In this position the third tuyere 13c cooperates in keeping the temperature of the bath uniform also towards the tapping outlet 36.

As can be seen in FIG. 5 the tuyeres 13 cooperate with a ring 34 that that in this case has a circular development and surrounds the upper electrodes 11. This circular ring 34 is defined by an outer perimeter 32, which in this example is circular, and by an inner perimeter 33, which too is circular in this example.

A supersonic oxygen lance 12 acts between the second and third upper electrodes 11b–11c and near the third upper electrode 11c and faces the center of the furnace 10 so as to work on the molten metal in a zone devoid of tuyeres 13.

According to a variant a tuyere (not shown) for oxygen is included in association with the circular ring 34 and in relation to the zone where the supersonic oxygen lance 12 works, and progressively replaces that lance 12 during a working cycle.

Post-combustion burners 28 arranged according to the movement of the molten metal cooperate with the circular ring 34, that is to say, the action of one burner works as a support for the action of the next one; the burners in this example work in the normal direction of rotation of the metal determined by the upper electrodes 11.

FIG. 5 shows also refractory material 37, a furnace sidewall 30 containing the refractory material 37 and also cooling pipes 35 above the bath.

The method according to the invention includes also a step of injecting powdered coal on a carrier of air or nitrogen by means of ceramic-coated pipes 15, for instance, below the level 16 of the molten bath so as to replace the carbon used in the oxidation reaction.

These ceramic-coated pipes 15 are inclined in relation to the level 16 of the molten bath by an angle "δ" advantageously between 30° and 60° so as to prevent a flow-back of liquid metal into the pipes when the injection is stopped.

According to the invention the pressure of the blowing of the oxygen through the tuyeres 13 is set and modulated functionally according to the individual processing steps and on the basis of specific separated periods during those steps. The pressure is set according to values determined in experiments as being the best for the specific processing period and for the product to be made.

FIG. 4 shows an example of a tuyere 13 used in the method according to the invention for injection of oxygen from the bottom of the furnace 10. This tuyeres 13 has a central pipe 18 for delivery of oxygen, the pipe 18 being obtained in this case by machining a bore in a polygonal copper section 19.

This polygonal copper section 19 is surrounded by a cylindrical pipe 20 so as to create a plurality of sectors 21 between each side 17 of the polygonal copper section 19 and the inner circumference of the cylindrical pipe 20. The sectors 21 form passages for the gaseous cooling mixture.

The central pipe 18 delivering oxygen preferably has a diameter between 8 and 30 mm., depending on the capacity of the electric furnace 10.

The cooling mixture passing through the sectors 21 consists of at least one gas having a high cooling power, methane in this example, and of a diluting, or "filling", gas, which in this example is $CO_2$.

FIG. 3 shows with a block diagram the system for instantaneous adjustment of the percentages of the components of the cooling mixture.

The adjustment of the percentages is carried out by keeping unchanged, or substantially unchanged, at a value determined a priori as being essential for ensuring the desired and necessary cooling of the tuyeres 13, the ratio between the quantity of cooling gas in the mixture and the rate of flow of the oxygen.

In this example the primary adjustment is carried out by means of an adjustment circuit 27 on the pressure of oxygen injected through the central delivery pipe 18 of the tuyeres 13. The adjustment of the pressure affects the rate of flow of the oxygen, that rate of flow being read continuously by a flow reader means 23 and being sent to a regulator 24, which acts on a valve 25 positioned on the $CO_2$ delivery line so as to vary the pressure of the $CO_2$.

The variation of the $CO_2$ pressure causes a corresponding variation of the rate of flow of the $CO_2$, and this variation of the rate of flow is compensated in a mixer 26 by a variation of an opposite sign of the $CH_4$.

According to a variant the pipes feeding the cooling mixture and the oxygen are insulated electrically to prevent overheating caused by the formation of induced currents.

This invention is especially efficacious when associated with electrical supply systems which enable the electric furnace 10 to work in the condition of a long arc.

We claim:

1. Electric arc furnace with alternative sources of energy, used for melting metals, which functions with direct current or alternating current, comprising:
   a hearth and furnace sidewall to contain a bath;
   at least one upper electrode to generate an electric arc;
   at least one lance provided on the furnace sidewall to inject pure or combined oxygen above an upper level of the bath inside the furnace;
   a plurality of tuyeres provided in the hearth, each tuyere comprising a central oxygen delivery pipe having an inner diameter between 8 and 30 mm for delivery of oxidation gas so that a pressure of emission of the oxidation gas is modulated at at least above a minimum pressure according to phases of charging of the furnace, and an outer peripheral pipe surrounding the central oxygen delivery pipe to form at least one passage between the central oxygen delivery pipe and outer peripheral pipe for conveying a cooling mixture, the cooling mixture comprising at least one cooling gas having a high cooling power and at least one diluting gas which are combined in a mixer, the mixer being operably connected to the at least one passage;

a flow reader for reading a rate of flow of the oxidation gas to each central delivery pipe; and a regulator for regulating flow rates of the at least one cooling gas and the at least one diluting gas to the mixer based on the flow rate of the oxidation gas.

2. Electric furnace as in claim 1, in which the pressure of emission of the oxidation gas is about 11 bar at a maximum.

3. Electric furnace as in claim 1, in which the rate of flow of the oxidation gas in each single tuyere is between 0 and 1000 Nm³ per hour.

4. Electric furnace as in claim 1, in which the rate of flow of the oxidation gas in each single tuyere is between 30 and 400 Nm³ per hour.

5. Electric furnace as in claim 1, further comprising post combustion burners.

6. Electric furnace as in claim 5, in which the rate of flow of the oxidation gas in the tuyere is in a proportion of about ⅓ of the rate of flow of oxygen in the post-combustion burners.

7. Electric furnace as in claim 1, in which the tuyeres are arranged in cooperation with an imaginary ring, which surrounds the at least one upper electrode.

8. Electric furnace as in claim 7, in which an outer perimeter of the imaginary ring is located at a distance from a center of the furnace not greater than three quarters of the distance between that center and the furnace sidewall.

9. Electric furnace as in claim 8, in which an inner perimeter of the imaginary ring is located at a distance from a center of the furnace not less than one quarter of the distance between that center and the furnace sidewall.

10. Electric furnace as in claim 7, in which the imaginary ring is circular.

11. Electric furnace as in claim 1, in which two tuyeres are positioned in the hearth one on each side of a fourth hole in a roof of the furnace.

12. Electric furnace as in claim 11, in which one of the two tuyeres positioned in the hearth one on each side of the fourth hole is displaced towards a slag hole in sidewall.

13. Electric furnace as in claim 11, in which a third tuyere is positioned towards a tapping outlet and at another side of a median axis of the hearth of the furnace from a side where a nearest upper electrode is located.

14. Electric furnace as in claim 1, in which the cooling mixture comprises methane in a percentage which is varied according to the pressure of the oxidation gas, a working step, a type of scrap and a quality of steel required.

15. Electric furnace as in claim 5, in which the rate of flow of the oxidation gas in the tuyeres is in a proportion between ⅔ and 1/10 of the rate of flow of oxygen in the post-combustion burners.

16. Electric furnace as in claim 1, wherein said at least one gas having a high cooling power is selected rom the group consisting of methane, butane and inert gases and wherein said at least one diluting gas is selected from the group consisting of nitrogen, and carbon dioxide.

17. Electric furnace as in claim 1, which includes at least one pipe to introduce powdered coal on a carrier of air or nitrogen.

18. Electric furnace as in claim 17, in which the at least one pipe to introduce powdered coal includes at least an outlet segment consisting of a replaceable ceramic-coated pipe and is positioned below the level of the bath, the ceramic-coated pipe having a diameter of about 18–25 millimetres and being inclined in relation to the bath by an angle "α" of at least 30°.

19. Electric furnace as in claim 1, which includes at least one supersonic oxygen lance in at least one zone of the furnace devoid of tuyeres injecting oxygen.

20. Electric furnace as in claim 1, further comprising means for introducing additives.

21. Electric furnace as in claim 1, in which the central oxygen delivery pipe and outer peripheral pipe are electrically insulated.

22. Electric arc furnace with alternative sources of energy, used for melting metals, which functions with direct current or alternating current, comprising:

a hearth and furnace sidewall to contain a bath;

at least one upper electrode to generate an electric arc;

at least one lance provided on the furnace sidewall to inject pure or combined oxygen above an upper level of the bath inside the furnace;

a plurality of tuyeres provided in the hearth, each tuyere comprising a central oxygen delivery pipe having an inner diameter between 8 and 30 mm for delivery of oxidation gas so that a pressure of emission of the oxidation gas is modulated at at least above a minimum pressure according to phases of charging of the furnace, wherein the central oxygen delivery pipe has an outer surface having polygonal shape, and an outer peripheral pipe surrounding the central oxygen delivery pipe, wherein the outer peripheral pipe is a circumferential toric element, thereby forming a passage between each side of the central oxygen delivery pipe and an inner circumference of the outer peripheral pipe for conveying a cooling mixture, the cooling mixture comprising at least one cooling gas having a high cooling power and at least one diluting gas.

23. Electric arc furnace as in claim 22, wherein the at least one cooling gas having a high cooling power and the at least one diluting gas are combined in a mixer operably connected to the passages provided in each of the plurality of tuyeres, and wherein the electric arc furnace further comprises a flow reader for reading a rate of flow of the oxidation gas to each central delivery pipe and a regulator for regulating flow rates of the at least one cooling gas and the at least one diluting gas to the mixer based on the flow rate of the oxidation gas.

24. A method for melting metals in an electric arc furnace with alternative sources of energy, the arc furnace functioning with direct current or alternating current, comprising:

providing metal in the furnace and containing the metal by the hearth and furnace sidewall;

generating an electric arc within the furnace;

injecting pure or combined oxygen into the furnace above an upper level of a metal bath therein through at least one lance provided on the furnace sidewall;

delivering an oxidation gas into the bath through a plurality of tuyeres provided in the hearth, each tuyere comprising a central oxygen delivery pipe having an inner diameter between 8 and 30 mm for delivery of the oxidation gas so that the pressure of emission of the oxidation gas is modulated at at least above a minimum pressure according to phases of charging of the furnace;

conveying a cooling mixture, the cooling mixture comprising at least one cooling gas having a high cooling power and at least one diluting gas, through at least one passage formed between the central oxygen delivery pipe and an outer peripheral pipe;

reading a rate of flow of the oxidation gas to each central oxygen delivery pipe; and regulating flow rates of the at least one cooling gas and at least one diluting gas based on the flow rate of the oxidation gas.

25. A method for melting metals in an electric arc furnace with alternative sources of energy, the arc furnace functioning with direct current or alternating current, comprising:

providing metal in the furnace and containing the metal by the hearth and furnace sidewall;

generating an electric arc within the furnace;

injecting pure or combined oxygen into the furnace above an upper level of a metal bath therein through at least one lance provided on the furnace sidewall;

delivering an oxidation gas into the bath through a plurality of tuyeres provided in the hearth, each tuyere comprising a central oxygen delivery pipe having an inner diameter between 8 and 30 mm for delivery of the oxidation gas and an outer surface having polygonal shape so that the pressure of emission of the oxidation gas is modulated at at least above a minimum pressure according to phases of charging of the furnace; and conveying a cooling mixture, the cooling mixture comprising at least one cooling gas having a high cooling power and at least one diluting gas, through a plurality of passages formed between each outer side of the central oxygen delivery pipe and an inside of a circumferential toric outer peripheral pipe provided around the central oxygen delivery pipe.

26. Method as in claim 25, further comprising reading a rate of flow of the oxidation gas to each central oxygen delivery pipe and regulating flow rates of the at least one cooling gas and at least one diluting gas based on the flow rate of the oxidation gas.

* * * * *